United States Patent [19]

Wrench

[11] Patent Number: 4,811,821
[45] Date of Patent: Mar. 14, 1989

[54] COMPACT DRUM BRAKE ADJUSTER

[75] Inventor: Nigel C. Wrench, Gwent, Wales

[73] Assignee: Lucas Industries Public Limited Company, Birmingham, England

[21] Appl. No.: 96,594

[22] Filed: Sep. 11, 1987

[51] Int. Cl.$^4$ .................. F16D 51/00; F16D 65/56
[52] U.S. Cl. .................................. 188/79.62; 188/329
[58] Field of Search ................... 188/79.5 GE, 79.5 S, 188/79.5 K, 79.5 P, 79.5 SC, 329, 331, 332, 196 BA, 79.5 GT, 196 M, 196 D, 79.56, 79.62; 192/111 A, 111 T

[56] References Cited

U.S. PATENT DOCUMENTS 3,882,974  5/1975  Hill ..................... 188/79.5 GE X
3,891,068  6/1975  Camph .................. 188/79.5 GE X
4,380,277  4/1983  Ingram et al. ................ 188/329

Primary Examiner—Andres Kashnikow
Assistant Examiner—Robert J. Oberleitner
Attorney, Agent, or Firm—Harness, Dickey & Pierce

[57] ABSTRACT

An automatic adjusting mechanism for a drum-type brake including a pair of slidably supported tappets for actuating the brake. The tappets are comprised of two threadably connected components which effect adjustment for wear upon relative rotation of the components. An interconnecting shaft insures simultaneous rotation of the respective components of the pair and an automatic adjusting device including an over-adjustment preventing mechanism operates on an extension of this interconnecting shaft.

24 Claims, 4 Drawing Sheets

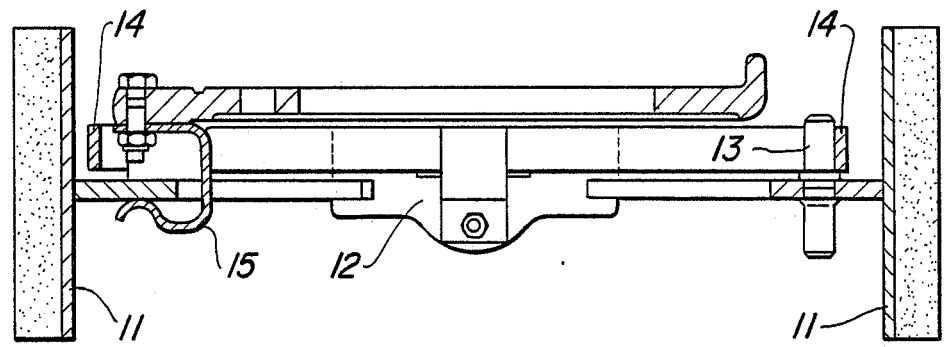
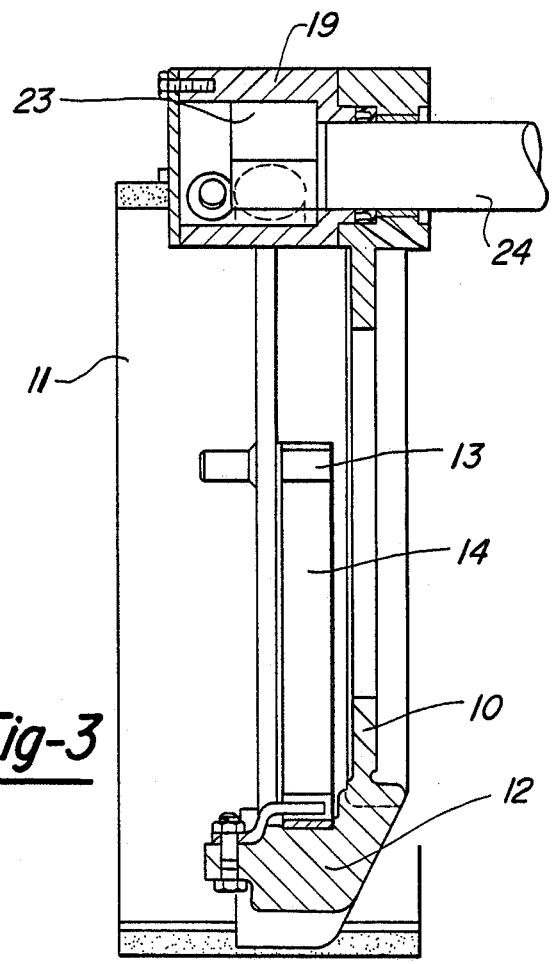

COMPACT DRUM BRAKE ADJUSTER

BACKGROUND OF THE INVENTION

This invention relates to a drum brake adjuster and more particularly to an improved automatic adjuster for use in an actuator that will have a compact configuration, prevent over-adjustment and which can be simply and conveniently manufactured.

A tappet-type of drum brake adjuster is shown in U.S. Pat. No. 4,380,277, entitled "Automatic Slack Adjusters For Vehicle Shoe-Drum Brakes," issued Apr. 19, 1983 in the names of Brian Ingram et al and assigned to the assignee of this application. This tappet-type of adjuster employs a pair of tappets that are interposed between an actuating member and respective brake shoe ends. The tappets are urged outwardly by the actuator for effecting actuation of the brake shoes. Each tappet comprises two screw-threaded members and an arrangement is incorporated for adjusting the length of the tappets by rotating the screw-threaded members upon wear. In order to equalize adjustment, some form of mechanism is provided for transmitting rotation between the corresponding members of the tappets.

Although the mechanisms shown and described in that patent are extremely effective, the automatic adjusting mechanisms disclosed therein are disposed at the outer periphery of the backing plate and hence increase the size of the brake mechanism at its periphery. This has the effect of limiting the application of this type of brake actuator and adjusting mehanism to brakes having fairly large diameter. However, it is desirable to provide this type of brake in applications where small wheels and drums are required, such as trucks, including those using the new generation of smaller diameter wheels and tubeless tires.

It is, therefore, a principal object of this invention to provide an improved and compact drum brake actuator and automatic adjuster.

It is a further object of this invention to provide a drum brake actuator and automatic adjuster including adjusters of the tappet type wherein the mechanism for adjusting the tappet may be positioned remotely from the tappet.

It is yet another object of this invention to provide an improved mechanism for operating and automatically adjusting a tappet type drum brake actuator.

In the embodiments illustrated in U.S. Pat. No. 4,380,277, the rotation of at least one of the tappet components is accomplished by means of a pinion that engages a gear formation on the outer periphery of the tappet component. Again, this type of construction places the automatic adjusting mechanism at the outer periphery of the brake and incrases the requisite size of the brake assembly resulting in the aforenoted disadvantages. In addition, this type of configuration requires an extended length of the gear formation on the sliding tappet in order to provide sufficient length for adequate sliding support and to accommodate the full travel of the tappet relative to the pinion.

It is, therefore, a further object of this invention to provide an improved automatic adjuster for a tappet type brake actuating mechanism that will reduce the length of gear formation of the individual tappets and still will provide adequate sliding support.

In addition to the size and spatial disadvantages of automatic adjusters and tappet-type actuators as shown in U.S. Pat. No. 4,380,277, the mechanism shown in that patent also will provide adjustment dependent upon the degree of brake shoe travel. If the brake shoes or more specifically the brake shoe ends travel excessively due to a condition other than wear, such as drum deflection, those actuators and adjusters may tend to over-adjust and result in brake drag and excessive brake shoe wear.

It is, therefore, a further object of this invention to provide a drum brake actuator including an automatic adjuster that does not sense drum deflection.

It is a further object of this invention to provide an automatic drum brake adjuster that senses excess clearance only.

In addition to the spatial requirements created by the fact that the interconnecting gearing and adjusting gearing increase the axial length, particularly in order to provide sufficient sliding support area, the arrangement shown in U.S. Pat. No. 4,380,277 places the threaded connection externally of the sliding support and requires a screw-threaded member that extends substantially into the web of the brake shoes. This further increases the size requirements of the assembly and tends to reduce the effective sliding support of the tappet assemblies.

It is, therefore, a still further object of this invention to provide an improved, compact tappet-type brake shoe adjuster wherein both the tappet components of each tappet are slidably supported within the same bore so as to give added sliding support and yet minimize the overall size of the assembly.

SUMMARY OF THE INVENTION

A first feature of this invention is adapted to be embodied in a drum brake actuator that is comprised of a pair of tappets that are slidably supported relative to respective brake shoe ends for actuating the brake shoes into frictional engagement with an associated brake drum for braking the brake drum. Actuating means are provided for moving the tappets in a direction to apply the brake shoes. Each of the tappets comprise first and second screw connected components that are operable upon relative rotation to effect a change of length in the tappets to compensate for wear. Means also are provided for interconnecting the respective components of the struts for simultaneous rotation. In accordance with this feature of the invention, automatic adjusting means are spaced away from the periphery of the strut components and from the interconnecting means for effecting adjustment of the struts.

Another feature of the invention is also adapted to be embodied in a drum brake actuator that is comprised of a pair of tappets that are slidably supported relative to respective brake shoe ends for moving the brake shoes into frictional engagement with an associated brake drum. Actuating means are incorporated for moving the tappets in a direction to apply the brake shoes. Each of the tappets comprise first and second screw-connected components that are operable upon relative rotation to effect a change in the length of the tappet to compensate for wear. Means interconnect the respective components for simultaneous rotation and automatic adjusting means is effective to change the length of the tappets upon wear. The automatic adjusting means includes a device to limit the degree of adjustment on a given cycle so as to prevent over-adjustment due to drum deformation.

Yet another feature of the invention is adapted to be embodied in a drum brake actuator that is comprised of a pair of tappets that are slidably supported relative to respective brake shoe ends for actuating the brake shoes into frictional engagement with an associated brake drum. Actuating means are provided for moving the tappets in a direction to apply the brake shoes. Each of the tappets comprise first and second screw-connected components that are operable upon relative rotation to effect a change in the length of the tappets to compensate for wear. In accordance with this feature of the invention, the first and second components are cylindrical members having the same external diameter and are slidably supported within a common bore.

BRIEF DESCRIPTION OF THE DRAWINGS

FIG. 2 is a cross-sectional view taken along the line 2—2 of FIG. 1.

FIG. 3 is a cross-sectional view taken along the line 3—3 of FIG. 1.

DETAILED DESCRIPTION OF THE PREFERRED EMBODIMENT OF THE INVENTION

Figure 1:
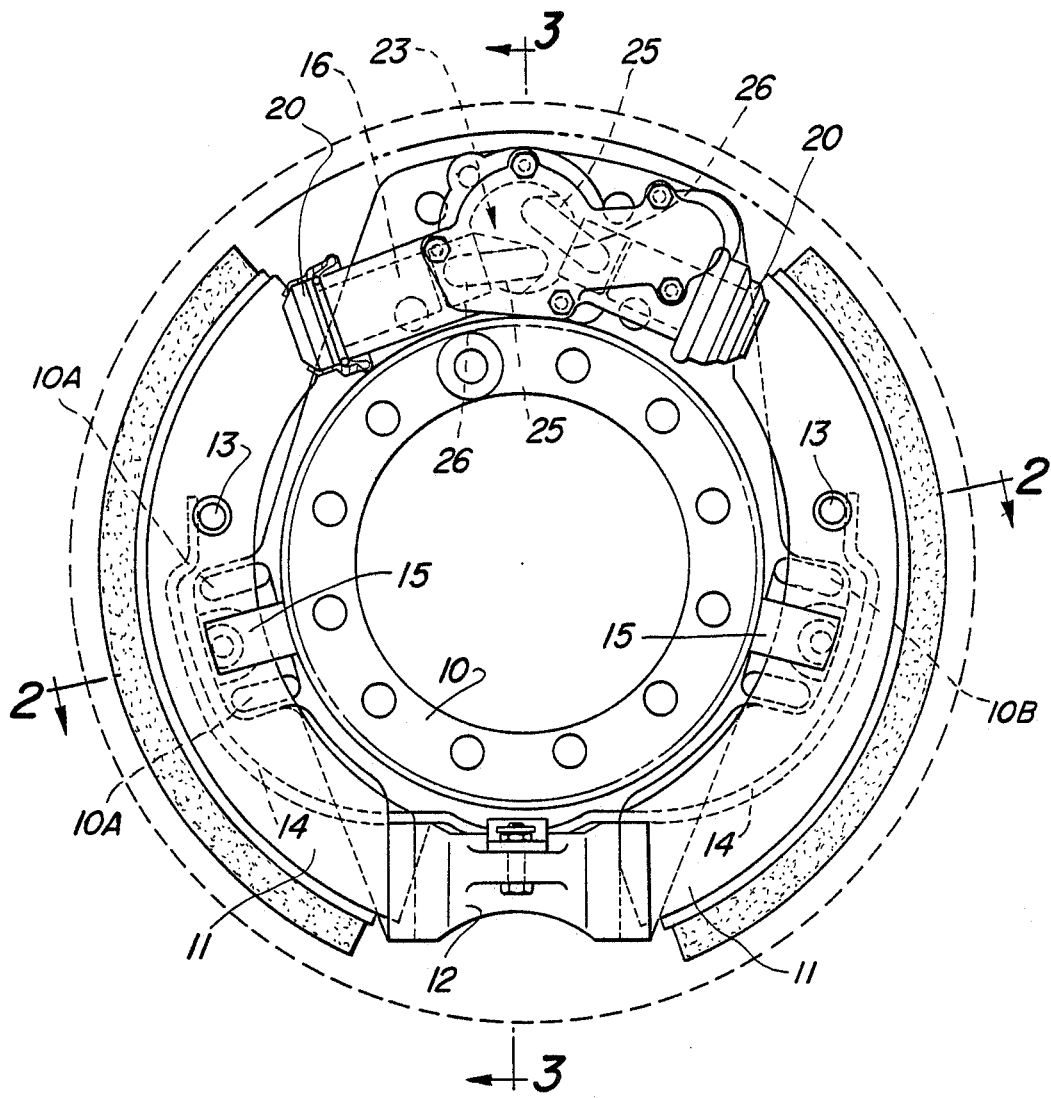
FIG. 1 is side elevational view of a drum brake constructed in accordance with an embodiment of the invention with the brake drum removed.

Referring to the drawings and, initially, primarily to FIGS. 1 through 3, a brake constructed in accordance with an embodiment of the invention comprises a torque or backing plate 10 which is adapted to be mounted on an axle assembly (not shown) of a vehicle in a known manner. The brake also comprises a pair of brake shoes 11 of arcuate form, the presented lower ends of the shoes engaging a fixed abutment 12 either fixed to or integral with the backing plate 10. The shoes 11 carry posts 13, respectively, which are arranged such as to engage the arms 14 of a generally "U" shaped spring carried on the abutment 12, and costituting shoe return means. Each shoe 11 is biased toward the backing plate 10 by a respective spring clip 15, the force exerted by the clips causing engagement of the brake shoes 11 with the torque plate 10 at locations 10A, 10B.

At their upper ends the presented ends of the shoes are engaged by tappet assemblies 16 respectively. Each tappet assembly 16 includes a first component 17 of cylindrical form which is axially slidable in a bore formed in a housing part 18 (see also FIG. 4).

The two housing parts 18 are integrally formed with a cam housing 19 which is secured to or integrally formed with the backing plate 10. The first tappet components 17 are provided with slotted heads 20 which project from the housings and are engaged by the webs of the shoes 11 respectively and thereby are prevented from rotating in their bores. Dust covers are provided between the heads 20 and the housing parts 18 to prevent ingress of dust. The tappet assemblies 16 include second components 21 of the same diameter as the first components 17 and which are also slidable in the respective housing bores and which are provided with screw-threaded stems 22 engaged within complementarily threaded bores formed in the first components 17.

Located in the cam housing 19 is an angularly movable cam 23 which is coupled to a cam shaft 24 journaled in the backing plate 10 and which in use is connected to an actuator, for example, an air cylinder (not shown). The cam 23 is provided with a pair of recesses 25 the inner ends of which are spherical form and which recesses 25 accommodate the spherical ends of a pair of struts 26. The opposite spherical ends of the struts 26 locate in spherical recesses formed in the second components 21 of the tappet assemblies.

Figure 4:
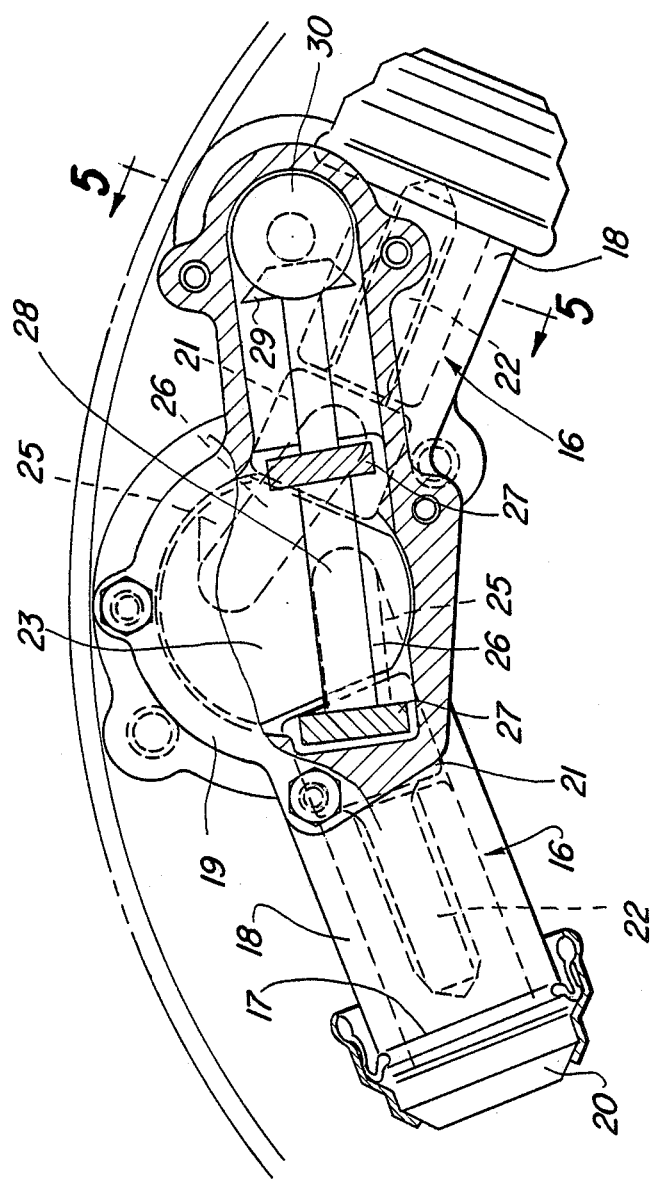
FIG. 4 is an enlarged side elvational view, with a portion broken-away, showing the brake actuator and adjuster mechanism.

The arrangement is such that when the cam shaft 24 and thus the cam 23 is moved angularly in the clockwise direction as viewed in FIGS. 1 and 4, the struts 26 will urge the upper ends of the shoes 11 outwardly to apply the brake against the associated brake drum (FIG. 1) which is fixed for rotation in a known manner to an associated vehicle wheel (not shown). The shoes 11 are returned out of engagement with the drum by the spring 14 when the shaft 24 and cam 23 are returned to the position shown.

In order to compensate for wear of the linings of the shoes 11 the effective length of the tappet assemblies 16 is increased by causing relative rotation of the components 17 and 21 of each assembly. For this purpose, the first components 21 of the tappet assemblies are each provided with external gear teeth which engage with teeth formed on a pair of pinions 27 which are mounted upon a common shaft 28 journaled in the cam housing 19. The teeth on the pinions 27 and the components 21 are arranged so that rotation of the shaft 28 in one direction will cause the stems 22 to unscrew out of the bores in the components 21 thereby lengthening both tappet assemblies 16. As will be seen from FIG. 4, the shaft 28 is extended beyond one of the pinions 27, the end of the extended portion of the shaft 28 mounting a bevel gear 29 of which the teeth mesh with the teeth of bevel gear 30.

Figure 5:
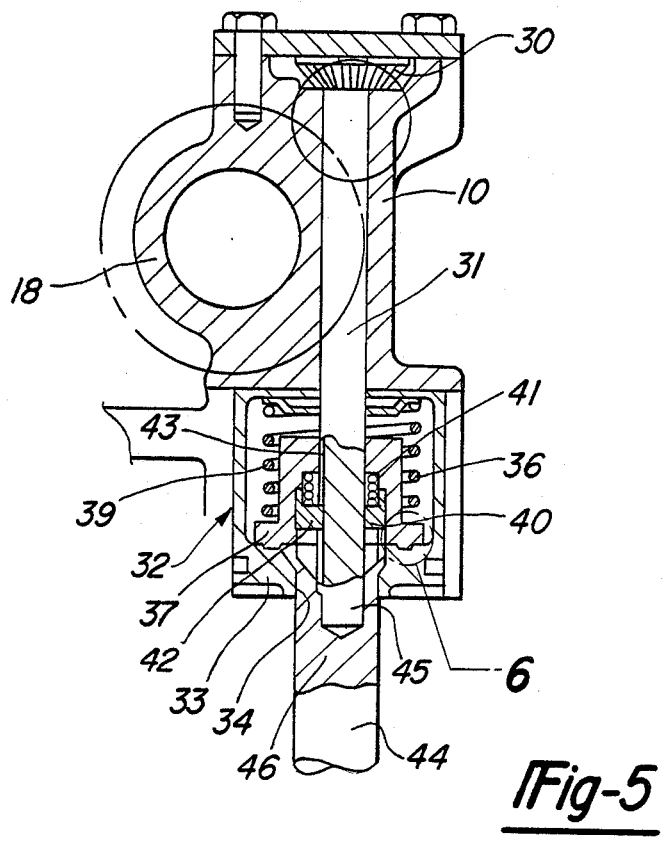
FIG. 5 is a cross-sectional view taken along the line 5—5 of FIG. 4.
Figure 6:
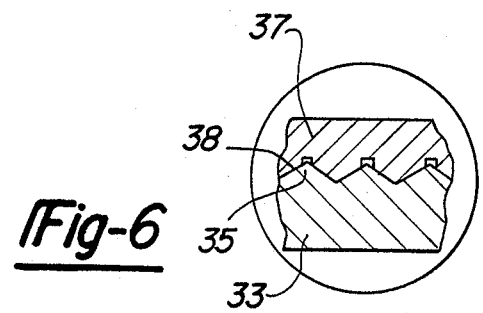
FIG. 6 is an enlarged view of the area encompassed by the circle 6 in FIG. 6 and looking perpendicular to it and shows the over-travel or over-adjustment limiting mechanism.

The gear 30 is fixed upon a shaft 31 (FIG. 5) which is journaled in and extends through the backing plate 10 into a cup shaped housing or capsule 32 which is assembled into a bore formed in the rear surface of the backing plate 10 or the actuator housing. The cup shaped housing capsule 32 is secured against rotation in a suitable manner to its supporting member. The base wall 33 of the housing is provided with a central opening 34 and its inner surface is formed with radial teeth 35 (FIG. 6). Located in the housing and mounted about the shaft 31 is an annular member 36 which at its end presented to the base wall 33 is provided with flange 37 upon which are formed complimentary teeth 38 for engagement with the teeth 35. A spring 39 is provided to bias the teeth 35 and 38 into engagement with each other.

A bore in the member 36 is counterbored to provide location for a bush 40 and a coil spring 41. The bush 40 is recessed into which recess is fixed one end of a short length of a coil spring 41. The bore of the bush 40 is provided with a key 42 which is slidable within an axial groove 43 in the shaft 31 to rotatably coupled the bush 40 to shaft 31. Finally, a manually operable member 44 is provided which extends through the opening 34 and has a flared end within the housing 32. The member 44 is formed with a bore 45 into which the shaft 31 extends, and a key 46 is formed at one end in the bore 45 and which upon movement of the member into the housing can be engaged within the shaft groove 43. Movement of the member 44 into the housing 32 is against the action of the spring 39 such movement causing axial movement of the annular member 36 to disengage the teeth 35, 38.

In operation, and first of all assuming that no wear of the linings of the shoes 11 has taken place, rotation of the actuating cam/cam shaft 23, 24 to cause outward movement of the shoes 11 as aforedescribed will result only in the backlash between the teeth of the pinions 27 and the components 21 of the tappet assemblies 16 being taken up. This backlash provides the normal clearance between the lining and the drum. There will be no rotation of the shaft 28 or shaft 31 during this initial movement.

As the actuating shaft 24 and cam 23 are further rotated to apply the brake, the aforesaid gear backlash having been taken up as described, but the tappet assemblies must move a further amount before applying load to the drum. Initially, there will be a tendency to rotate the shaft 28 and also through the bevel gear connection, the shaft 31. This initial rotation of the shaft 31 causes the bush 40 to rotate by way of the key and groove connection 42, 43. This has the effect of "opening out" the coil spring 41 against the member 36 thus locking the shaft 31, so that further rotation of the shaft 31 and also of the shaft 28 is prevented.

The aforedescribed movement constitutes the maximum permitted movement of the tappet assemblies to bring the frictional linings of the shoes 11 into engagement with the associated brake drum before adjustment will take place. If, drying any phase of this movement, the frictional linings engage the drum, there will not be an adjustment effected. If, however, there is sufficient lining wear, the tappet assemblies 16 must continue to move outwardly through the backlash and the components 21 thereof are caused to rotate by virtue of their geared connections with the pinions 27 which are now held against furthe rotation due to the action of the coil spring 41 that acts in a uni-directional manner. Such rotation of the component 21 of the tappet assemblies results in the stems 22 being unscrewed from the bores causing an increase in the length of the tappet assemblies. The axial and rotational movement of the components 21 continues until the clearance between the lining and the drum is taken up and the brake is applied.

When the brake is released by rotation of the cam 23 and cam shaft 24 in the counterclockwise direction, the return spring 14 will urge the brake shoes 11 to their retracted positions. This effects an axial load on the struts 16. As the struts 16 move inwardly, the shaft 28 may freely rotate since the brake formed by the coil spring 41 will be relaxed and the shaft 31 is also free to rotate in the return direction. The frictional loading of the screw-threaded connection between the tappet components 17 and 21 will prevent any relative rotation and the adjustment which has been previously made in the manner described will not be cause to back off.

If a heavy braking load is applied such as to cause deflection of drum, the tappet assemblies 16 will move outwardly an additional amount. However, during the additional movement a high axial thrust is transmitted through the tappet assemblies 16 so that friction prevents relative rotation of the components 17, 21 of the tappet assemblies. As a result, the shafts 28 and 31 are rotated, but since the shaft 31 is locked to the member 36 by the coil spring 41, the member 36 is rotated causing it to move axially relative to the shaft 31 tending to move teeth 38, 35 out of engagement against the action of the spring 36 thereby providing the effect of a torque limiting clutch. In an alternative embodiment, a multiplate clutch could be used for this purpose. If the drum delfection is sufficiently severe, the flange 37 is permitted to index round to a limited extent by slipping of its teeth 38 on the teeth 35, in order to compensate for the excessive deflection.

The manually operable shaft 44 is provided for the purpose of de-adjusting the tappet assemblies 16 to permit drum removal and when fitting new shoes 11. Depression of the shaft 44 disengages the teeth 35, 38 and rotation of the shaft 44 in the appropriate direction causes rotation of the shafts 31 and 28 which rotate the components 21 of the tappet assemblies 16 relative the components 17 to reduce the lengths thereof.

It will be understood that instead of providing backlash between the teeth of the pinions 27 and components 21 as described above, in order to establish the necessary shoe to drum clearance, the necessary play may alternatively, or additionally, be provided at the bevel gear 30, or at the tongue and groove connection 42, 43 between the coil spring bush 40 and the shaft 31.

By operating the adjuster from an axial extension of the shaft 28 via the bevel gears 29 and 30, rather than directly from one of the tappets as in the prior art, the tappets may be foreshortened and the adjuster itself advantageously positioned in order to provide a compact arrangement. The example of adjuster described operates during brake actuation and thus senses excessive clearance only, the adjuster ceases to adjust above a predetermined load and is, therefore, "load insensitive". The adjuster assembly is easier to install and service by virtue of the capsule arrangement which houses the complete adjuster. The fact that both of the tappet components 21 and 17 are slidably supported in the same bore of the supporting housing also permits a shortening of the length from the prior art constructions.

It is to be understood that the foregoing description is that only of a preferred embodiment of the invention and in addition to the modifications which have been described, various other changes and modifications may be made without departing from the spirit and scope of the invention, as defined by the appended claims.

What is claimed is:

1. In a drum brake actuator comprised of a pair of tappet assemblies slidably supported relative to respective brake shoe ends for actuating the brake shoes into frictional engagement with an associated brake drum for braking the rotation of the brake drum, actuating means for moving said tappets in a direction to apply the brake shoes, each of said tappets comprising first and second screw-threaded components operable upon relative rotation to effect a change in the length of said tappets to compensate for wear, and means for interconnecting the second components of said tappets for simultaneous rotation including a shaft rotatable about an axis extending transversely to the axis of the associated brake drum, the improvement comprising automatic adjusting means spaced from said tappets and from said interconnecting means for effecting adjustment of said tappets by controlling the rotation of said shaft, said automatic adjusting means being operable about an axis extending transversely to said shaft axis.

2. In a drum brake actuator as set forth in claim 1 wherein the automatic adjusting means operates in response to excess travel upon actuation of the brake shoes.

3. In a drum brake actuator as set forth in claim 2 wherein the automatic adjusting means includes for limiting the degree of adjustment in response to excessive brake loading to render the adjuster load insensitive.

4. In a drm brake actuator as set forth in claim 1 wherein the first component of each tappet is non-rotatably affixed to the respective brake shoe end and the second component of each tappet is supported for rotation relative to the first component.

5. In a drum brake actuator as set forth in claim 1 wherein the automatic adjusting means effects relative rotation of said tappet components in response to the movement of at least one of said tappets for more than a predetermined amount for adjusting for wear and further including means for limiting the degree of adjustment in response to excessive brake forces to render the adjuster load insensitive.

6. In a drum brake actuator as set forth in claim 5 wherein the means for providing automatic adjustment effects rotation of the first of the tappet components relative to the second of the tappet components.

7. In a drum brake actuator as set forth in claim 6 wherein the means for limiting the degree of adjustment includes means for limiting the degree of rotation of the first tappet components.

8. In a drum brake actuator as set forth in claim 7 wherein the automatic adjusting means comprises a unidirectional means for limiting movement of the interconnecting means and the means for limiting the degree of adjustment comprises means for releasing the unidirectional means in response to an excessive application force.

9. In a drum brake actuator as set forth in claim 8 including manual adjusting means operable to release the unidirectional means for moving the interconnecting means for manual adjustment.

10. A drum brake actuator comprised of a pair of tappet assemblies slidably supported relative to respective brake shoe ends for actuating the brake shoes into frictional engagement with an associated brake drum for braking the rotation of the brake drum, actuating means for moving said tappets in a direction to apply the brake shoes, each of said tappets comprising first and second screw-threaded components operable upon relative rotation to effect a change in the length of said tappets to compensate for wear, the first of said tappet components being non-rotatably coupled to the respective brake shoe and the second of said tappet components being supported for rotation relative to the respective first tappet component, means for interconnecting the second components of said tappets for simultaneous rotation including a shaft rotatably coupling said second components, and automatic adjusting means spaced from said tappets for effecting adjustment of said tappets comprising means for limiting the degree of turning of said shaft, said shaft having a connection to said second tappet components for effecting rotation thereof when said second tappet components move axially and said shaft is held against turning.

11. In a drum brake actuator as set forth in claim 10 wherein the means for limiting the degree of turning of the shaft comprises a unidirectional device acting upon said shaft.

12. In a drum brake actuator as set forth in claim 11 further including means for permitting turning of the shaft of the interconnecting means in response to the application of excessive brake forces to render the adjuster load insensitive.

13. In a drum brake actuator as set forth in claim 12 wherein the means for permitting turning of the shaft comprises releasable means for selectively releasing the unidirectional device upon the application of such excessive brake forces.

14. In a drum brake actuator as set forth in claim 10 wherein the shaft is provided with and extension an the automatic adjusting means operates on said shaft extension.

15. In a drum brake actuator as set forth in claim 14 wherein the automatic adjusting means has a motion transmitting connection to the shaft extension.

16. In a drum brake actuator as set forth in claim 15 wherein the means for limiting the degree of turning of the shaft comprises a unidirectional device acting upon the motion transmitting connection.

17. In a drum brake actuator as set forth in claim 16 further including means for permitting turning of the shaft in response to the application of excessive brake forces to render the adjuster load insensitive.

18. In a drum brake actuator as set forth in claim 17 wherein the means for permitting turning of the shaft comprises releasable means for selectively releasing the unidirectional device upon the application of such excessive brake forces.

19. In a drum brake actuator as set forth in claim 16 wherein the unidirectional device operates on a further shaft that has a geared connection to the shaft and which further shaft extends perpendicularly to said shaft and forms part of the motion transmitting connection.

20. In a drum brake actuator as set forth in claim 19 wherein the tappet components are cylindrical and have the same diameter and are slidably supported in a common bore.

21. In a drum brake actuator as set forth in claim 20 wherein a housing assembly is non-rotatably affixed relative to the brake shoes and comprises first and second portions having respective bores in which the tappets are slidably supported and an intermediate housing portion containing a rotatable cam, and further including a pair of struts each interposed between said rotatable cam and one of said tappets for actuating said tappets upon rotation of said cam.

22. In a drum brake actuator as set forth in claim 21 wherein the unidirectional device and the means for preventing over-travel adjustment are contained within a capsule affixed relative to said housing.

23. In a drum brake actuator as set forth in claim 22 further including manually operable means for rotating the second tappet components by releasing the unidirectional device.

24. In a drum brake actuator comprised of a pair of target assemblies slidably supported relative to respective brake shoe ends for actuating the brake shoes into frictional engagement with an associated brake drum for braking the rotational of the brake drum, actuating means for moving said tappets in a direction to apply said brake shoes, each of said tappets comprising first and second screw-threaded components operable upon relative rotation to effect a change in the length of said tappets to compensate for wear, means for interconnecting repsective components of said tappets for simultaneous rotation, and automatic adjusting means for effecting relative rotation of said components to compensate for wear, the improvement comprising said components having a cylindrical configuration of the same diameter and being slidably supported in a common bore, the threaded connection between said components being disposed axially within the bore.

* * * * *

UNITED STATES PATENT AND TRADEMARK OFFICE
CERTIFICATE OF CORRECTION

PATENT NO. : 4,811,821
DATED : March 14, 1989
INVENTOR(S) : Nigel C. Wrench

Page 1 of 2

It is certified that error appears in the above-identified patent and that said Letters Patent is hereby corrected as shown below:

```
Column 1, line 51, "the" (second occurrence) should be --that--.
Column 1, line 54, "incrases" should be --increases--.
Column 3, line 22, "elvational" should be --elevational--.
Column 3, line 29, "6" (second occurrence) should be --5--.
Column 3, line 47, "costituting" should be --constituting--.
Column 4, line 8,  after "are" insert --of--.
Column 4, line 60, "coupled" should be --couple--
Column 5, line 30, "drying" should be --during--.
Column 5, line 37, "furthe" should be --further--.
Column 5, line 44, delete "the" (first occurrence).
Column 6, line 3, "delfection" should be --deflection--.
Column 7, line 2, Claim 3, after "includes" insert --means--.
Column 7, line 6, Claim 4, "drm" should be --drum--.
Column 8, line 7, Claim 14, "and" should be --an--.
Column 8, line 7, Claim 14, "an" should be --and--.
Column 8, line 36, Claim 21, "shoes" should be --shoe--.
```

UNITED STATES PATENT AND TRADEMARK OFFICE
CERTIFICATE OF CORRECTION

PATENT NO. : 4,811,821

DATED : March 14, 1989

INVENTOR(S) : Nigel C. Wrench

It is certified that error appears in the above-identified patent and that said Letters Patent is hereby corrected as shown below:

Column 8, line 51, Claim 24, "target" should be —tappet—.

Column 8, line 54, Claim 24, "rotational" should be —rotation—.

Column 8, line 60, Claim 24, "repsective" should be —respective—.

Signed and Sealed this

Twenty-third Day of July, 1991

Attest:

*Attesting Officer*

HARRY F. MANBECK, JR.

*Commissioner of Patents and Trademarks*